United States Patent [19]

Carter

[11] 4,096,429
[45] Jun. 20, 1978

[54] VOLTAGE AND CURRENT REGULATOR FOR GENERATING SYSTEMS

[76] Inventor: Lonnie S. Carter, P.O. Box 544, Ashland, Kans. 67831

[21] Appl. No.: 722,046

[22] Filed: Sep. 10, 1976

[51] Int. Cl.² .............................................. H02P 9/30
[52] U.S. Cl. ........................................ 322/28; 322/70; 323/22 T; 323/38
[58] Field of Search ................... 322/8, 27, 28, 69, 70; 323/17, 19, 20, 22 T, 38

[56] References Cited

U.S. PATENT DOCUMENTS

| | | | |
|---|---|---|---|
| 2,993,127 | 7/1961 | Noll | 323/22 T |
| 3,448,342 | 6/1969 | Jacobs | 323/22 T |
| 3,525,924 | 8/1970 | Atterholt | 322/28 |
| 3,546,532 | 12/1970 | Eisenstadt | 322/28 X |

Primary Examiner—A. D. Pellinen
Attorney, Agent, or Firm—Boone, Schatzel, Hamrick & Knudsen

[57] ABSTRACT

A regulator for controlling the field exitation current of a generating device when the voltage developed exceeds a preset level and including a first resistor for establishing the level of a base current, a first transistor responsive to the base current for selectively developing the exitation current, a first switching device which is biased on and is connected between the first resistor and the base of the first transistor and a second switching circuit for monitoring the generator voltage and for switching the first switching device off preventing current flow in the first resistor when the voltage exceeds a preset level. The regulator also includes four terminals and a connecting strap configured to permit universal application of the regulator.

9 Claims, 4 Drawing Figures

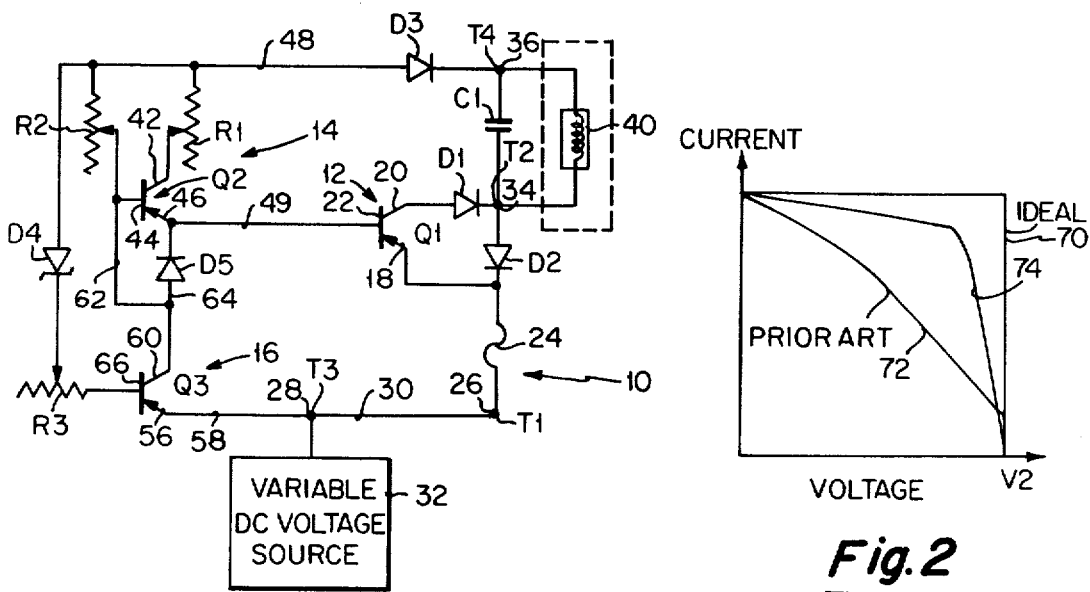
Fig.1
Fig.2
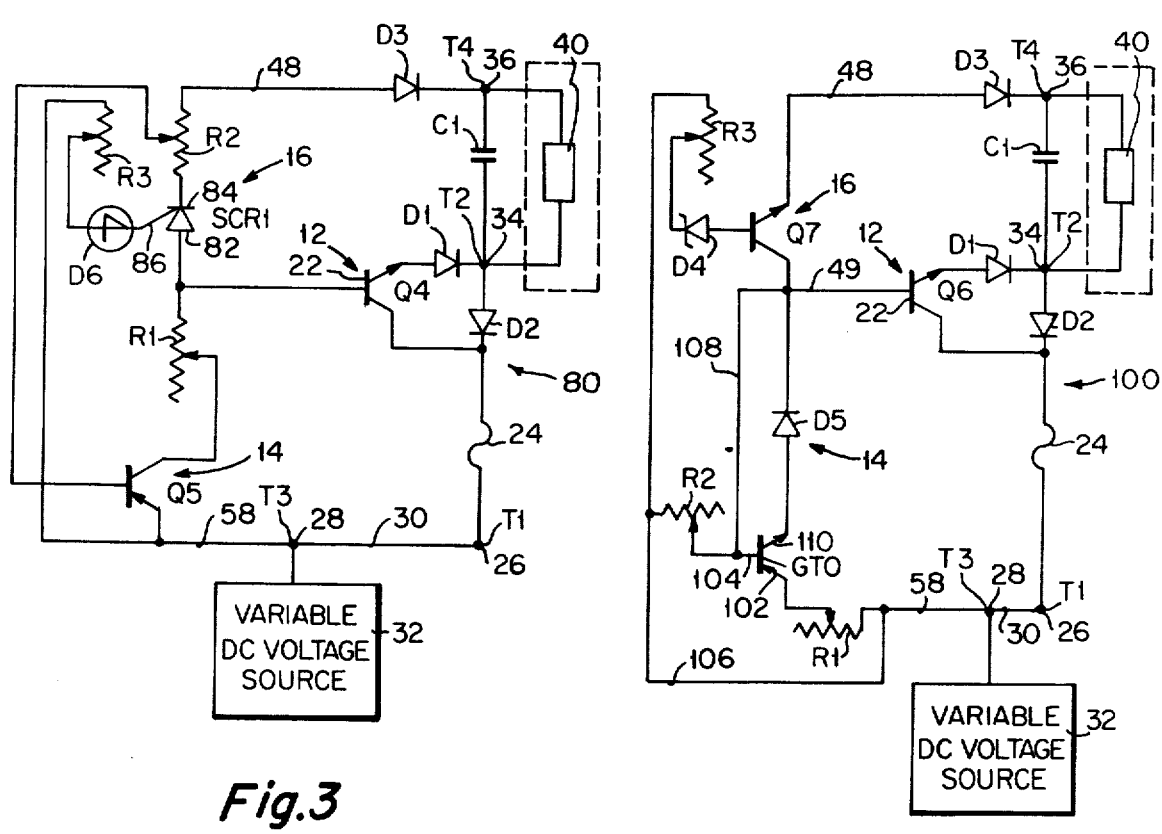
Fig.3
Fig.4

VOLTAGE AND CURRENT REGULATOR FOR GENERATING SYSTEMS

BACKGROUND OF THE INVENTION

1. Field of the Invention

The present invention relates generally to voltage regulators, and more particularly, to a voltage and current regulator having switchable voltage-sensitive elements which respond to variations in the potential difference appearing across two reference terminals and serve to positively turn on and turn off a power transistor or the like.

2. Description of the Prior Art

A voltage regulator is generally employed in a generating circuit to limit the generator voltage and current to predetermined values by controlling the generator field current.

Heretofore, voltage regulators for use in generating systems typically include a power transistor or the like, which when conductive permits current to flow in a field winding of a generator. In one type of regulator a second transistor is connected with its collector-emitter path across the base-emitter path of the power transistor and with its collector connected to the base of the power transistor and to a reference voltage supplying conductor through an arrangement of bias resistors. The conduction of the second transistor is controlled by voltage sensitive means in its base circuit that respond to the potential difference across two reference terminals of the regulator. However, in order to turn off the power transistor, the second transistor is required to supply a relatively high current through the bias resistors, and hence a corresponding high voltage, to the base of the power transistor before the bias voltage developed is able to cause the power transistor to stop conducting. As a result, the power transistor is slow to turn off in response to substantial increases in the potential difference appearing across the reference terminals. In addition, substantial currents flow through the bias resistors when the power transistor is turned off, resulting in a substantial power loss and heat production in the circuit.

An example of such a voltage regulator is found in U.S. Pat. No. 3,593,113, entitled "Voltage Regulators Using Plannar Transistors With Radio Interference Suppression," by David Wiley.

SUMMARY OF THE PRESENT INVENTION

Accordingly, it is a primary object of the present invention to provide a voltage and current regulator circuit which is able to positively turn on and turn off its power transistor while minimizing heat production in the circuit when the power transistor is turned off.

Another object of the present invention is to provide a voltage and current regulator circuit which is capable of providing a preselected current to a load device over a broad range of potential differences appearing across its sensing terminals.

Yet another object of the present invention is to provide a universal voltage and current regulator circuit that is capable of operation in systems employing any combination of positive and negative grounds and internally or externally grounded generator field windings.

Still another advantage of the present invention is to provide a voltage and current regulator circuit which is capable of stable operation under varying load, speed and temperature conditions.

Briefly, the preferred embodiment comprises a first terminal capable of receiving a first potential, a second terminal capable of receiving a second potential, the potential difference between the first and second potentials being subject to variations, a first switching transistor responsive to the potential difference and operative to conduct and to provide a first signal when the potential difference is less than a predetermined value, the first transistor further being operative to switch to a nonconducting state in response to a second signal, a first diode circuit responsive to the potential difference and operative to provide a third signal when the potential difference reaches the predetermined value, a second switching transistor coupled to the first transistor and the diode circuit and being operative to conduct and to provide the second signal in response to the presence of the third signal and to switch to a nonconducting state in the absence of the third signal, and a third switching transistor connected to the first and the second transistors and having an output terminal, the third transistor serving to provide current through the output terminal when it is in the conducting state, the third transistor being responsive to the third signal and being operative to switch to the conducting state in response to the third signal and to switch to the nonconducting state in the absence of the third signal.

An advantage of the present invention is that it is capable of positively turning on and turning off an output power transistor or the like while minimizing heat generated in the circuit when such transistor is turned off.

Another advantage of the present invention is that it is capable of generating a selected output current in the upper voltage range of the system.

Yet another advantage of the present invention is that it is operative in systems employing positive and negative grounds and employing internally or externally grounded fields.

Still another advantage of the present invention is that it lends itself to miniaturization and is capable of stable operation under varying load, speed and temperature conditions of a generator.

These and other objects and advantages of the present invention will no doubt become apparent after reading the following detailed description of the preferred embodiments which are illustrated in the several figures of the drawing.

In the drawing

FIG. 1 is a circuit diagram schematically illustrating a preferred embodiment of the voltage and current regulator circuit in accordance with the present invention;

FIG. 2 is a graphical representation of the current versus voltage characteristics of several voltage regulators; and FIGS. 3 and 4 are circuit diagrams schematically illustrating alternative embodiments of voltage and current regulator circuits in accordance with the present invention.

DETAILED DESCRIPTION OF THE PREFERRED EMBODIMENTS

Referring now to FIG. 1 of the drawing, a voltage and current regulator circuit 10 in accordance with the present invention is schematically illustrated. The circuit 10 comprises an output device 12, a turn-on circuit 14 and a turn-off circuit 16 which may be used in generating systems in such a manner as to limit the generator voltage and current to a predetermined value by controlling the generator field current.

In the description that follows, with respect to components of the circuits 12, 14 and 16, a transistor is denoted by the letter Q followed by a number, a resistor by the letter R followed by a number, and other types of components by an identifying letter, such as C for a capacitor and D for a diode, followed by a number. Nodal points within the network are designated solely by a number. Similarly external connections are indicated by the letter T followed by a number.

Although the various elements are shown in the form of discrete classical electrical components, it will be appreciated that these elements are only representative of the electrical characteristics exhibited by varous components and that the voltage regulator may be fabricated as an integrated circuit.

The output device 12 is in the form of a PNP type of power switching transistor Q1 having an emitter 18, a collector 20 and a base 22. The emitter 18 is connected through a fuse 24 to a terminal T1 and 26 which is coupled to an adjacent terminal T3 and 28 by a conductive connecting strap 30. The fuse 24 serves to prevent currents above a rated value from flowing through the transistor Q1. A source 32 of positive DC potential is connected to the terminal T3. The potential of the source has nominal level V1 and varies when the generator is operating so that it exceeds a predetermined upper reference level V2. The collector 20 is connected to the anode of the diode D1, whose cathode is connected to a terminal T2 and 34. The diode D1 serves to suppress positive voltage spikes from reaching the collector 20. A capacitor C1 is connected between the terminal T2 and 34 and a terminal T4 and 36. In the preferred embodiment the terminal 36 is connected to T4. Connected in series across the terminal T2 and T4 is a load device 40 such as, for example, the field winding of a generator. A diode D2 is connected between the terminal 34 and the emitter 18 and serves to suppress negative voltage spikes. The capacitor C1 serves to dissipate the energy contained in the transient voltages.

The turn-on circuit 14 comprises a switching transistor or the like Q2, a current limiting resistor or rheostat R1, a bias resistor or rheostat R2 and a diode D3. The transistor Q2 is of the PNP type and has a collector 42, a base 44 and an emitter 46. The resistor R1 has a resistance that can be varied by selectively adjusting the position of its wiper and is connected between the collector 42 and a conductor 48. The value of the resistance R1 is adjusted to provide a preselected current in the circuit comprising the transistors Q1 and Q2, and hence a preselected current flowing to the load device 40. The resistor R2 is connected between the base 44 and the conductor 48 and has a resistance that can be varied by selectively adjusting the position of its wiper. The resistor R2 serves to control the level of the bias voltage which is necessary to turn on the transistor Q2. The diode D3 is connected between the conductor 48 and terminal 36 and serves to suppress transient voltages from effecting the operation of transistor Q2. A conductor 49 connects the emitter 46 and the base 22. The transistor Q2 is rendered conductive when the potential difference appearing across the terminals T3 and T4 is sufficient to forward bias its base to emitter junction.

The turn-off circuit 16 comprises the transistor Q3, a bias resistor or rheostat R3 and a zener diode D4. The transistor Q3 is of the PNP type of switching transistor and has its emitter 56 connected through a conductor 58 to the positive terminal T3, its collector 60 connected by a conductor 62 to the base 44 and by a conductor 64 to a blocking diode D5. Its base 66 is connected to a fixed terminal of the bias resistor R3 which has its wiper connected to the cathode of the zener diode D4. The resistance of the resistor R3 is adjustable and serves to develop a bias voltage which controls the turn-on characteristic of transistor Q3. The anode of the zener diode D4 is connected to the conductor 48, which diode is selected to conduct when the voltage appearing at its cathode exceeds a predetermined reference voltage.

In operation, the wiper of the rheostat R1 is set to limit current through the transistor Q1 to that which is commensurate with load requirements. In addition, the wiper of the rheostat R2 is set so that the transistor Q2 turns on or conducts when a desired voltage is applied to the base of transistor Q2. Similarly, the wiper of the rheostat R3 is set so that the transistor Q3 turns on when a predetermined potential difference appears between its emitter and its base. With the source 32 connected to the terminal T3 and supplying a positive potential to the conductors, such potential is supplied through the voltage dropping emitter-base junction of the transistor Q1 to the emitter 46, thus forward biasing the junction and rendering the transistor Q2 conductive. The positive potential is also supplied through the conductor 58, the emitter-base junction of the transistor Q3, and the rheostat R3 to the cathode of the zener diode D4. The zener diode D4 prevents current from flowing to the ground conductor 48 until a higher predetermined potential is present at its cathode. Hence Q3 does not conduct.

As soon as transistor Q2 turns on it completes a circuit path causing transistor Q1 to turn on and supply current through the diode D1 to the T2 terminal. As previously described the quantity of current flowing to the load 40 is controlled by the settings of the rheostats R1 and R2.

As the generator charges, the voltage appearing at the terminal T3 increases, which increases the potential difference appearing across the terminals T3 and T4. When the voltage reaches the level V2 which corresponds to a level sufficient to render the diode D4 conductive, the diode conducts. This causes the transistor Q3 to conduct or turn on. As transistor Q3 switches on, current simultaneously flows through a conductor 62 to base 44 and through diode D5 and conductor 49 to the base 22 of transistor Q1, causing both transistors Q1 and Q2 to switch off. With transistor Q2 turned off, current ceases to flow to the field windings 40 which causes the current supplied by the generator to drop. When it reaches a voltage sufficiently less than the level V2, the diode D4 stops conducting which causes the base-to-emitter voltage to be insufficient to maintain conduction of the transistor Q3 so that it turns off. As transistor Q3 turns off it causes both transistors Q2 and Q1 to turn on. The transistors remain on until the voltage again climbs to V2.

During the switching functions of the circuit 10, the diodes D1, D2 and D3 serve to suppress transient signals from entering the transistor Q1 and the circuits 14 and 16. Similarly the diode D5 serves to block reverse current flow from the base 22 and emitter 46 from reaching the collector 60 of the transistor Q3.

It should be recognized that in accordance with the present invention when the potential difference appearing across the terminals T3 and T4 is less than V2, the transistors Q2 and Q1 are turned on and the transistor Q3 is turned off and that when the potential difference equals or exceeds V2, Q2 is turned on which in turn causes Q1 and Q2 to turn off. Because of this positive switching arrangement an extremely close control of generator current and voltage is achieved. In addition, since transistor Q2 is turned off resistor R1 is effectively removed from the circuit of transistor Q1 while it is not conducting. Hence current does not flow through the resistor and heat generation during the off condition is avoided.

With reference to FIG. 2, a graph of current versus voltage for several voltage regulators is illustrated. The curve 70 illustrates the characteristic for an ideal regulator and is seen to produce a constant current over the entire range of voltages. The curve 72 illustrates the characteristic for a voltage regulator of the prior art. As shown, the current decreases substantially as the voltage approaches V2. In the type of regulator illustrated by curve 72 applied to a standard generator, it has been found that a current of between 18 and 20 amperes is produced when a potential difference of about 13 volts appears across the voltage-sensing terminals. While a relatively high current of about 2 amperes is produced when the potential difference is about 14 volts and the output transistor is supposedly switched off. Such current adversely effects the battery and tends to reduce its life expectancy.

In comparison, the curve 74 illustrates the characteristic for the voltage and current regulator 10 shown in FIG. 1 and can be seen to approximate the ideal characteristic curve in that it provides a substantially constant current over substantially the entire voltage range. In particular the regulator 10 applied to the same standard generator has been found to provide a current of between 35 and 40 amperes at a potential difference of 13 volts and to produce a relatively small current of 0.5 amperes at 14 volts.

It should be noted that the feature of providing the four terminals T1, T3, T2 and T4 enables the connecting strap 30 to be connected across the terminals T1 and T3 and the field 40 across the terminals T2 and T4 when an internally grounded field is used. Similarly, when an externally grounded field is used the positions of the connecting strap and the field are merely reversed. In either of these described field connections, either of the terminals T3 and T4 can be grounded. Accordingly, the present invention is capable of almost universal application.

Although the preferred embodiment has been described with reference to PNP transistors it should be obvious that NPN transistors can also be used in accordance with the present invention. Similarly the transistor Q1 could be replaced by other similar devices, such as a Darlington transistor configuration, etc.

Referring now to FIG. 3, a second embodiment of the voltage and current regulator circuit 80 formed in accordance with the present invention is illustrated in a schematic circuit diagram. Many of the components of the circuit 80 are similar to like parts in the circuit 10 described above, and accordingly, there has been applied to each like component of the regulator 80 an identical reference numeral to that applied to the circuit 10.

The fundamental difference between the regulator circuit of FIG. 3 and the regulator circuit of FIG. 1, which is described above, is that in the circuit of FIG. 3 the transistor Q4 corresponding to the transistor Q1 is of the NPN type and that the transistor Q3 has been replaced by a silicon controlled rectifier (SCR), designated as SCR1. In addition, the zener diode D4 has been replaced by a four-layer diode D6 which serves an identical function as in the preferred embodiment, and the diode D5 has been eliminated from the circuit in view of the characteristics of the SCR. Because of the change in the elements, and consequently the circuit biasing requirements, the respective locations of the turn-on circuit 14 and the turn-off circuit 16 appear to be reversed. It will be noted that the emitter of the transistor Q4 is connected to the diode D1 and the collector is connected through the fuse 24 and the connecting strap 30 to the terminal T3. Furthermore, the base 22 is connected via conductor 49 to the anode 82 of the device SCR1 and to one terminal of the rheostat R1. The wiper of rheostat R1 is connected to the collector of PNP switching transistor Q5 which has its emitter connected to the conductor 58 and to one end of the rheostat R3 and its base connected to the wiper of the rheostat R2. The cathode 84 of SCR1 is connected through a rheostat R2 to the conductor 48 and the gate 86 is connected through the four-layer diode D6 to the wiper of the rheostat R3.

In operation when the voltage supplied by the source 32 is less than V2, the voltage is supplied through the collector-to-base junction of the transistor Q4, the conductor 49 and resistor R1 to the collector of transistor Q5, and directly to the emitter of the transistor via conductor 58. Such voltage is also applied through the resistor R3 to the diode D6. However, since it is at a level that is insufficient to breakdown the diode it is unable to provide a trigger on the gate 86 of SCR1. Hence, SCR1 remains turned off. In addition, the ground potential on conductor 48 is applied through a portion of the resistor R2 to the base of Q5, and to the emitter of transistor Q4 causing the transistors Q4 and Q5 to be biased into a conduction mode. The resistor R1 serves to control the magnitude of the current flowing in the Q4–Q5 circuit when the transistors conduct. When the voltage appearing on conductor 58 equals or exceeds V2 and hence is sufficient to breakdown diode D6, it causes the diode to conduct. This causes a positive pulse to be applied to the gate 86 which in turn causes the SCR to conduct. When SCR is rendered conductive it grounds the collector of transistor Q5 and also the base 22 of transistor Q4, causing those transistors to immediately turn off. In addition, when transistor Q5 turns off it serves to remove the enabling voltage from the anode 82 of the SCR, causing the SCR to turn itself off. As previously described transistors Q4 and Q5 remain conductive until the source voltage again reaches V2. This embodiment lends itself to applications where high frequency switching is required.

Referring now to FIG. 4, a third embodiment of the voltage and current regulator circuit 100 formed in accordance with the present invention is illustrated in a schematic circuit diagram. As previously discussed many of the components of the circuit 100 are similar to like parts in the circuits 10 and 80, and accordingly, there has been applied to each like component an identical reference numeral to that applied to the circuit 80.

The fundamental difference between the voltage regulator circuit of FIG. 4 and the voltage regulator circuit of FIG. 1 is that in the circuit of FIG. 4 the NPN transistor Q6 corresponds to the transistor Q1, that the silicon controlled switch (SCS) also referred to as the gate turn-off switch (GTO), has replaced the transistor Q2 and that the NPN transistor Q7 has replaced the PNP transistor Q3. The GTO is a type of power device that is similar in operation to the SCR. However, when a positive gate pulse is applied, the GTO turns on and when a negative gate pulse is applied the GTO turns off. In addition, when supply voltage is removed, the GTO turns off.

As shown the output device 12 is similar to the device of FI. 3. However, in the turn-on circuit 14 the current controlling rheostat R1 is connected between the conductor 58 and the anode 102 of the GTO and the biasing rheostat R2 is connected between the gate 104 and the conductor 58 via the conductor 106. The gate 104 is also connected to the base conductor 49 by the lead 108. The transient suppressing diode D5 is connected between the cathode 110 and the junction of the conductors 108 and 49. In the turn-off circuit 16, the collector of the NPN switching transistor Q7 is connected to the junction between the conductors 108 and 49, the emitter is directly connected to the ground carrying conductor 48 and the base is connected through the zener diode D4 and the bias developing rheostat R3 to the conductor 106 carrying the positive voltage from the source 32.

In operation when the voltage supplied by the source 32 causes the potential difference between the terminals T3 and T4 to be less than V2 volts, the potential is supplied to the collector of the transistor Q6, and through the conductor 58 to the anode 102 of the GTO through the current limiting rheostat R1 and to the gate 104 via the conductor 106 and the bias rheostat R2.

This produces a positive pulse on the gate 104 which causes the GTO to turn on. When the GTO conducts it develops a bias voltage through the base-to-emitter junction of the transistor Q6 which causes transistor Q6 to turn on and to provide current to the load device 40. As in the previous embodiments the magnitude of the current is determined by the resistance of the rheostat R1 which is in the turn-on circuit 14. During this time the voltage on the conductor 106 is also provided to the zener diode D4. However, it is insufficient to breakdown the diode and hence Q7 does not conduct. When the voltage on terminal T3 and hence at diode D4 equals or exceeds V2, the diode breaks down causing transistor Q7 to conduct. This causes a lowered potential corresponding to the ground potential on conductor 48 to be applied via the transistor Q7 and the conductor 108 to the gate 104, thereby causing the GTO to switch off. Simultaneously the conduction of transistor Q7 causes the potential on the base 22 of the NPN transistor Q6 to drop, which turns the transistor off and terminates the supply of current to the load. The transistor Q6 remains off until the potential at terminal T3 drops below V2.

From the above, it will be seen that there has been provided a voltage and current regulator circuit which fulfills all of the objects and advantages set forth above.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. A voltage and current regulator comprising:
a first terminal capable of receiving a first potential;
a second terminal capable of receiving a second potential, the potential difference between said first and second potentials being subject to variations;
a first transistor switchable between a conducting and a nonconducting state, said first transistor being responsive to said potential difference and operative to conduct and to provide a first signal when said potential difference is less than a predetermined value, said first transistor further being responsive to a second signal and operative to switch to said nonconducting state in response to said second signal;
first means responsive to said potential difference and operative to provide a third signal when said potential difference reaches said predetermined value;
a silicon controlled rectifier connected to said first transistor and said first means and being switchable between a conducting and a nonconducting state, said rectifier being operative to conduct and to provide said second signal in response to the presence of said third signal and to switch to said nonconducting state in the absence of said first signal;
a second transistor connected to said first transistor and said rectifier and having an output terminal, said second transistor being switchable between a conducting and a nonconducting state and serving to provide current through said output terminal when it is in said conducting state, said second transistor being responsive to said first signal and said second signal and being operative to switch to said conducting state in response to said first signal and to switch to said nonconducting state in response to said second signal, whereby current is supplied to said output terminal as long as said potential difference is less than said predetermined value;
second means coupled to said first transistor for selectively controlling the magnitude of the current flowing through said output terminal;
third conductive means for connecting the base of said second transistor to the anode of said rectifier and to one end of said second means, the opposed end of said second means being connected to the collector of said first transistor, said first means being connected to the gate of said rectifier for causing said rectifier to conduct when said potential difference reaches said predetermined value;
fourth resistive means connected between the cathode of said rectifier and said second terminal;
fifth conductive means for connecting the base of said first transistor to a portion of said fourth resistive means; and
sixth conductive means for connecting the emitter of said second transistor and said output terminal.

2. A voltage and current regulator comprising:
a first terminal capable of receiving a first potential;
a second terminal capable of receiving a second potential, the potential difference between said first and second potentials being subject to variations;
a gate turn-off device switchable between a conducting and a nonconducting state, said gate turn-off device being responsive to said potential difference and operative to conduct and to provide a first signal when said potential difference is less than a predetermined value, said gate turn-off device further being responsive to a second signal and operative to switch to said nonconducting state in response to said second signal;
first means responsive to said potential difference and operative to provide a third signal when said potential difference reaches said predetermined value;

a first transistor connected to said gate turn-off device and said first means and being switchable between a conducting and a nonconducting state, said first transistor being operative to conduct and to provide said second signal in response to the presence of said third signal and to switch to said nonconducting state in the absence of said third signal;

a second transistor connected to said gate turn-off device and said first transistor and having an output terminal, said second transistor being switchable between a conducting and a nonconducting state and serving to provide current through said output terminal when it is in said conducting state, said second transistor being responsive to said first signal and said second signal and being operative to switch to said conducting state in response to said first signal and to switch to said nonconducting state in response to said second signal, whereby current is supplied to said output terminal as long as said potential difference is less than said predetermined value; and second means coupled to said gate turn-off device for selectively controlling the magnitude of the current flowing through said output terminal.

3. A voltage and current regulator as recited in claim 2 wherein said gate turn-off device includes an anode coupled through said second means to said first terminal, a cathode coupled to the collector of said first transistor and to the base of said second transistor and a gate, third resistive means coupled between said gate and said first terminal and serving to provide a first bias voltage on said gate, fourth conductive means for connecting the gate and the collector of said first transistor and serving to provide a second bias voltage on said gate that is less than said first bias voltage when said second transistor is in said conducting state, fifth conductive means for connecting the emitter of said first transistor and said second terminal, sixth conductive means for connecting said first terminal to the collector of said second transistor and seventh conductive means for connecting the emitter of said second transistor and said output terminal, said first means being connected between the base of said first transistor and said first terminal for causing said first transistor to conduct when said potential difference reaches said predetermined value.

4. In a generating system including a generating device having a field coil energized by a field current and operative to generate current, and a regulator for monitoring the generator voltage and for developing the field current when the generator voltage is less than a predetermined value, an improved regulator comprising:

a first pair of terminals including a first terminal connectable to one side of the generator, and a second terminal;

a second pair of terminals including a third terminal and a fourth terminal connectable to the other side of said generator;

a connecting strap connected across one pair of said first and second pairs of terminals, the other of said pairs of terminals being connectable across the field coil of the generating device;

sensing means responsive to the voltage developed between said first and fourth terminals and operative to develop a first control signal when said voltage is below a predetermined value, and operative to develop a second control signal when said voltage exceeds said predetermined value;

a first resistor;

a first switching means having a first electrode coupled to said first terminal by said first resistor, a second electrode coupled to said sensing means to receive said first and second control signals, and a third electrode, said first switching means being responsive to said first control signal and operative to switch to a first state in which a first current having a magnitude set by said first resistor is developed at said third electrode, and responsive to said second control signal and operative to switch to a second state in which current flow through said first resistor is substantially prevented and as a result any second current developed at said third terminal is of no substantial value; and second switching means having a fourth electrode coupled to said second terminal, a fifth electrode coupled to said third terminal, and a sixth electrode coupled to said third electrode, said second switching means being responsive to said first current and operative to switch to a first state wherein said second terminal is effectively connected to said third terminal so as to cause said field coil to be energized, and responsive to said second current and operative to switch to a second state wherein said field coil is energized.

5. In a generating system as recited in claim 4 and further comprising a second resistor coupling said second electrode to said fourth terminal; and wherein said sensing means include a zener diode; and third switching means having a seventh electrode coupled to said second electrode, an eighth electrode coupled to said first terminal, and a ninth electrode coupled to said fourth terminal by said zener diode.

6. In a generating system as recited in claim 5 and further comprising:

a third resistor connected between said ninth electrode and said zener diode.

7. In a generating system as recited in claim 6 wherein said first, second and third resistors include potentiometers.

8. In a generating system as recited in claim 4 wherein said sensing means includes a gate turn-off device.

9. In a generating system as recited in claim 4 wherein said first swiching means includes a silicon-controlled rectifier.

* * * * *